United States Patent [19]

Sebion et al.

[11] Patent Number: 5,667,143
[45] Date of Patent: Sep. 16, 1997

[54] SPRAY GUN FOR SPRAYING TWO FLUIDS

[75] Inventors: Timothy L. Sebion, Lakeville; Frederick A. Powers, Maple Grove; Calvin H. Pasvogel, Prior Lake, all of Minn.

[73] Assignee: Wanner Engineering, Inc., Minneapolis, Minn.

[21] Appl. No.: 373,640

[22] Filed: Jan. 17, 1995

[51] Int. Cl.⁶ ............................................. B05B 7/04
[52] U.S. Cl. .......................... 239/415; 239/528; 137/539; 137/540
[58] Field of Search ......................... 239/415, 528; 137/539, 540, 543.17

[56] References Cited

U.S. PATENT DOCUMENTS

| | | | |
|---|---|---|---|
| 1,292,318 | 1/1919 | Holton | 239/415 |
| 1,382,640 | 6/1921 | Heinrich | 239/415 |
| 2,107,686 | 2/1938 | Bramsen et al. | 239/414 |
| 2,804,343 | 8/1957 | Friedell | 239/415 |
| 3,130,910 | 4/1964 | Sill | 239/415 X |
| 3,157,361 | 11/1964 | Heard | 239/427 |
| 3,352,333 | 11/1967 | Glasgow et al. | 239/415 X |
| 3,915,388 | 10/1975 | Nathan | 239/415 |
| 4,083,497 | 4/1978 | Rosenberger | 239/526 |
| 4,315,600 | 2/1982 | Rhoades et al. | 239/74 |
| 4,529,000 | 7/1985 | Funk | 137/99 |
| 4,609,149 | 9/1986 | Jessen | 239/310 |
| 4,776,517 | 10/1988 | Heren | 239/391 |
| 4,915,304 | 4/1990 | Campani | 239/473 |
| 5,022,864 | 6/1991 | Ali | 439/192 |
| 5,176,327 | 1/1993 | Petersen et al. | 239/526 |
| 5,287,887 | 2/1994 | Hengesbach | 239/415 X |

Primary Examiner—Lesley D. Morris
Attorney, Agent, or Firm—Merchant, Gould, Smith, Edell, Welter & Schmidt

[57] ABSTRACT

A spray gun includes a barrel portion and a handle portion having a control lever pivotally mounted to a lower end of the handle controlling a valve system. The spray gun includes an interchangeable fitting for receiving two fluid lines. The lever is movable between a first lockable spray position, opening the valve system to spray one fluid, and a second spray position spraying two fluids.

14 Claims, 6 Drawing Sheets

SPRAY GUN FOR SPRAYING TWO FLUIDS

BACKGROUND OF THE INVENTION

1. Field of the Invention

The present invention relates to a spray gun, and in particular to a spray gun which controls and sprays two fluids.

2. Description of the Prior Art

Spray guns which receive fluid under pressure and spray the fluid are used for a variety of purposes, including spraying water, paints, fertilizers, insecticides, herbicides and other fluids and are well known. Spray guns typically connect to a hose or other fluid line and have a handle or trigger which controls the flow. In addition, spray guns that spray two mixed fluids are known in the art.

However, these spray guns have several shortcomings which decrease their overall utility. Many spray guns are capable of spraying one fluid or a mixture, but are not able to change between spraying a single fluid and a mixture of fluids. In addition, such guns do not provide a stop for the trigger at the spraying position to make holding the gun during spraying more comfortable. The spray guns which do provide for mixing of more than one fluid have valving systems which may cause a burst of flow when the fluids are mixed and which do not control backflow when a single fluid is being sprayed. Furthermore, such devices do not provide for changing to spraying with a variety of hose or fluid line sizes adapted to interchangeable fittings. The hoses often require entrance of a first line at a first location on the gun and a second fluid line at a second remote location on the gun to accommodate the valve system, rather than a single simple attachment for both fluids.

An example of a spray gun is shown in U.S. Pat. No. 4,083,497. The spray gun includes a lever which pivots at its lower end in the handle portion of the gun and actuates a valve which extends up through the handle portion. A fitting at the rear of the gun accepts a single fluid line for spraying fluid through the barrel portion. The lever includes a lock at an upper end which engages the sliding upper finger receiving portion of the lever so that the lever does not need to be held in for continuous spraying. However, the '497 patent does not provide for selectively spraying a second fluid or provide for a fitting for a second fluid line. The lever cannot be changed from the position regulating a first fluid to regulating a first and second fluid.

It can be seen then, that a new improved spray gun is needed which provides for controlling flow of either one or two fluids. The gun should provide for spraying a single fluid, or by actuation of the lever, spraying a mixture of fluids. Such a gun should be able to control both fluids or a single fluid and provide for spraying with a catch position on the trigger so that the trigger is supported at a spraying position. Furthermore, such a spray gun should provide for adapting to various sizes of fluid lines and shapes of fluid lines or hoses entering the gun and provide interchangeable fittings for adapting to the fluid lines. Moreover, the valving should control and regulate pressure buildups in the hose leading to the spray gun and prevent backflow from one fluid into another. The present invention addresses these as well as other problems associated with spray guns.

SUMMARY OF THE INVENTION

The present invention is directed to a spray gun and in particular to a spray gun for controlling spray of either one fluid or two fluids mixed together. The spray gun has a spray barrel portion and a handle portion extending generally downward from a rear portion of the barrel portion. The handle has a control lever pivotally mounted at a lower end thereof which controls a valve housed within the handle and barrel. The valve system controls flow so that either one or two fluids may flow through the gun and be sprayed.

The lever includes a sliding end trigger portion which allows for spraying of a single fluid with the trigger being supported while pulled inward for spraying of both fluids with support for the lever. In addition, the trigger may be slid upward to lock the valve so that one fluid is sprayed. In addition, the trigger must be pulled downward from its normal position to clear a ledge for spraying in order to spray both fluids.

The valve system includes a valve stem member actuated by the lever. The valve stem includes an end plug covering an opening to a spraying chamber of the barrel. The end plug is normally biased to a closed position but when the lever is pulled inward, the plug uncovers the opening and fluid is sprayed. The opening to a second fluid is covered until the lever is actuated further, wherein a sliding shoulder member, further down in a wider portion of the valve chamber which is normally biased to a closed position is pulled downward to allow a second fluid to mix with the first fluid. Both fluids are then sprayed from the gun.

The spray gun includes an attachment for interchanging fittings to various size fluid lines and also to control the relative flow of the two fluids. In addition, the attachment may include a fitting for only a single fluid line so that the gun may be adapted for spraying only one fluid. The attachment further includes a backflow valve which prevents the first fluid from flowing backward and mixing with the second fluid. The backflow valve also includes a ball which provides for laminar flow and reduces the likelihood of a large flow burst when the second fluid is initially sprayed.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views.

DETAILED DESCRIPTION OF THE PREFERRED EMBODIMENT(S)

Figure 1:
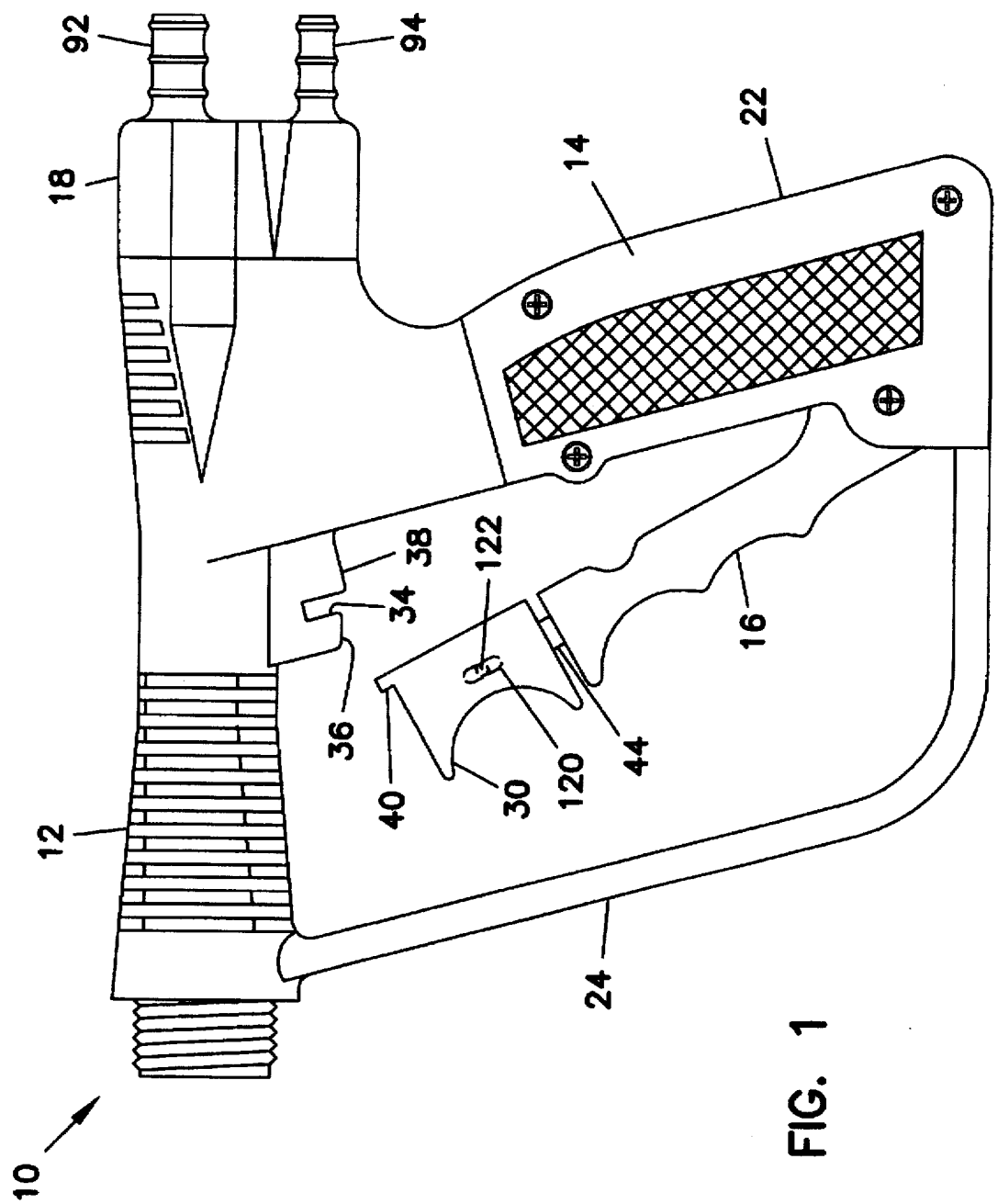
FIG. 1 shows a right side elevational view of a spray gun according to the principles of the present invention.

Referring now to the drawings, wherein like reference numerals designate corresponding structure throughout the views, and referring in particular to FIG. 1, there is shown a spray gun, generally designated 10, which receives fluids under pressure and sprays the fluids. The gun generally includes a barrel 12 defining a spray chamber 50 and a handle 14 extending downward from the rear of the barrel 12. From a lower portion of the handle 14, a lever 16 extends forward and upward. The lever 16 is configured to fit into the palm of an operator's hand and may include a formed grip portion for receiving fingers. The lever 16 pivots about a pivot point 32 on the lower portion of the handle 14. The lever 16 includes a sliding member 30 for receiving the top finger of the operator's hand. The sliding trigger member 30 includes a tab 40 extending upward which may engage a catch 34 extending from the barrel 12. The catch 34 includes an angled rim portion 36 which engages the upper surface of the tab 40 to direct and guide the lever 16 to a spraying position. As explained hereinafter, when the lever 16 has been pulled to the position shown in FIG. 4, a first fluid is sprayed. At this position, the tab 40 engages a ledge 38, preventing further pivoting of the lever 16. As also shown in FIG. 5, a spring 42 pushes the sliding member 30 upward along a mounting post 44 to prevent accidentally pulling the lever 16 further inward. As shown in FIG. 1, the trigger sliding member 30 has a slot 120 formed therein which receives a peg member 122 extending from the side of the mounting post 44. The peg member 122 slides within a limited range of motion relative to the slot 120, limiting sliding of the sliding trigger member 30.

As shown in FIG. 5, the spray gun 10 may also have the lever 16 locked in a spraying position. When the lever 16 is pulled to a position wherein the first fluid is sprayed and the tab 40 is resting against the ledge 38, the sliding trigger member 30 may be slid upward. The lever 16 is then allowed to pivot outward and the tab 40 will engage the catch 34. Tension from lever biasing spring 46 provides tension of the tab 40 against the catch 34 so that the lever 16 may be released without disengaging. Therefore, when the lever 16 is in the locked position shown in FIG. 5, an operator need not hold the lever inward to maintain continuous spraying. To release the lever 16 from the locked spraying position, the lever 16 is pulled inward, and the sliding end member 30 will fall down against the spring 42. In this position, the tab 40 will clear the catch 34 so that the lever may be released to discontinue spraying. In addition, a sliding member 30 may be pulled downward against the spring 42 for spraying a mixture of fluids, as explained hereinafter.

Figure 6:
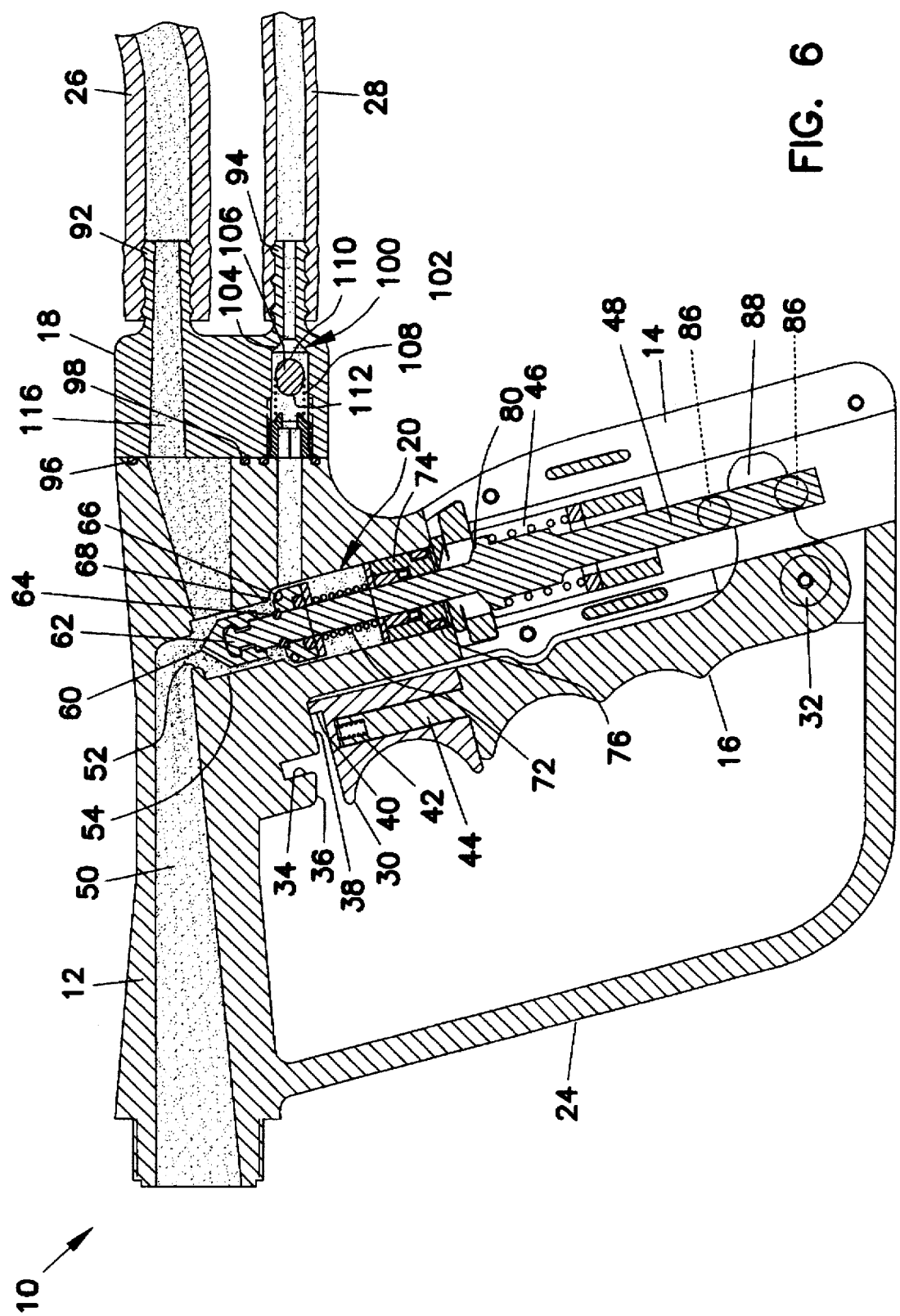

When the sliding member 30 is pulled downward to overcome the force of the spring 42, the lever 16 may be pivoted all the way inward against the handle 14, as shown in FIG. 6. In this position, as explained hereinafter, the spray gun 10 sprays two fluids. It can be appreciated that with this lever and trigger arrangement, the operator can easily control flow so that either a single fluid is sprayed or a mixture of two fluids are sprayed. The ledge 38 engaging the tab 40 and the spring 42 pushing upward against the sliding trigger member 30 prevent accidentally spraying two fluids and provides for a set position for spraying the first fluid and the catch 34 provides a lock for spraying. In addition, a handle guard 24 extends from a lower portion of the handle 14 to the front of the barrel 12 to prevent accidentally engaging the spray gun lever 16.

Referring now to FIG. 3-6, there is shown a valve system 20. The valve system 20 includes a plunger type valve stem 48 which is biased in an upward position by a valve spring 72 engaging a shoulder member 66 which is slidably mounted on the valve stem 48. The sliding shoulder member 66 engages tabs 64 extending radially outward from the valve stem 48. The valve stem 48 slides upward and downward along the handle 14 by the lever 16 engaging a lower portion of the valve stem 48. The lever 16 has a connecting strut 88 which slides between pivots 86 downward when the lever 16 is pulled inward, thereby pulling the valve stem 48 down.

Figure 3:
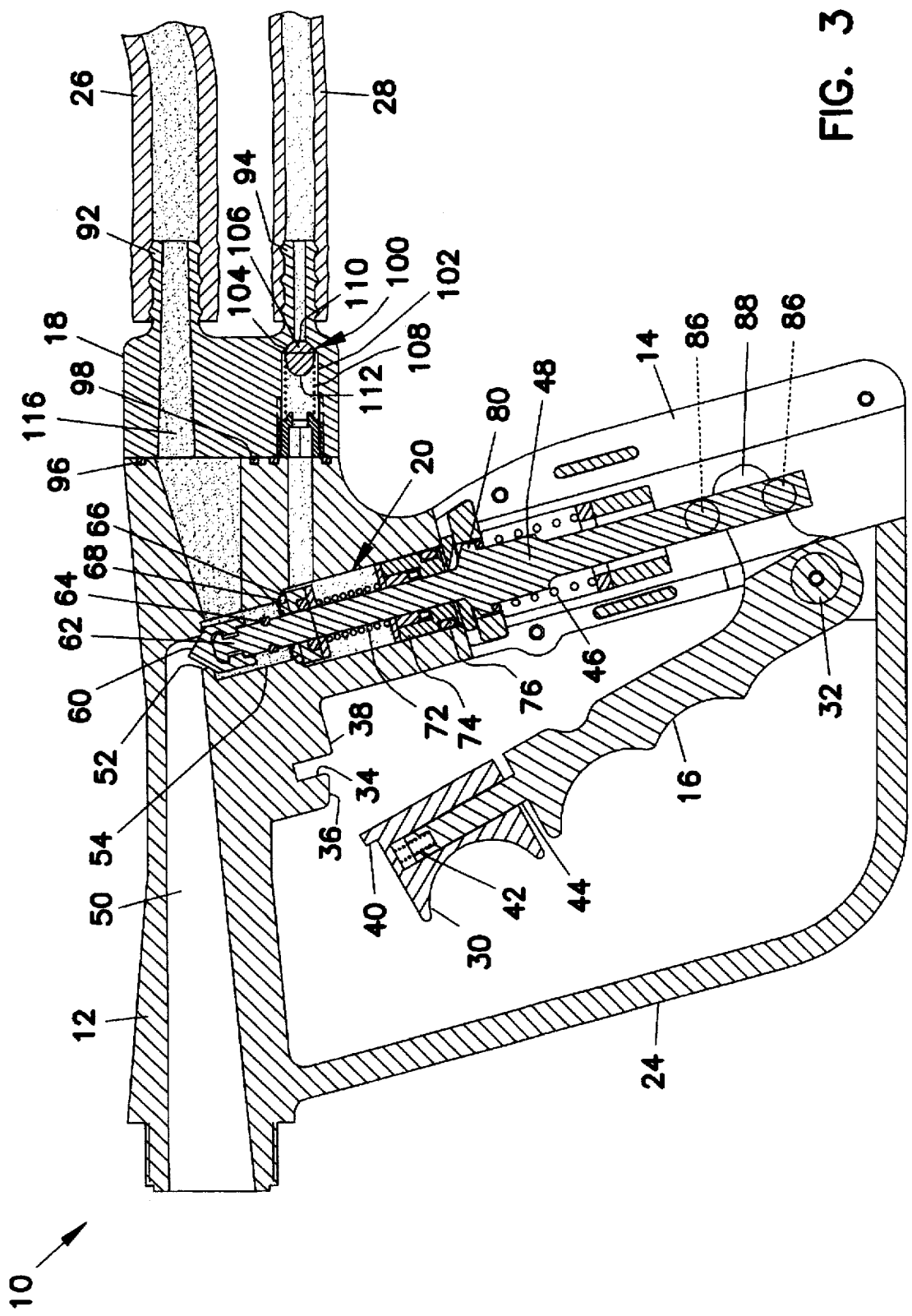
FIG. 3 shows a sectional view taken along line 3–3 of FIG. 2 with the spray valve closed.

The valve stem 48 includes an end plug type member 60 which is retained by a widened ring portion 62 of the valve stem 48. The end plug portion 60 covers an opening 52 to a barrel chamber 50 in the closed position, as shown in FIG. 3. In this position, all flow is stopped and neither the fluid from the main line or injection line are sprayed.

Below the plug member 60 on the valve stem 48, a sliding shoulder member 66 is biased upward by a coil type spring 72. A bushing 74 and an O-ring 76 seal below the mixing chamber 54 to prevent leakage into the lower portion of the handle 14.

The lower portion of the valve stem 48 includes a shoulder 80 engaging the lever spring 46. The lever spring 46 pushes against the handle 14 to urge the valve stem 48 upward and rotate the lever 16 and the valve stem 48 back to a closed position.

At the rear of the gun 10 is an interchangeable fitting attachment member 18 receiving fluids under pressure. The attachment member 18 is normally mounted with screws to the gun 10 at the rear of the barrel 12. A preferred embodiment of attachment member 18 has a first fitting 92 for a main fluid line 26 and a second fitting 94 for an injection fluid line 28. The attachment member 18 is sealed with O-rings 96 and 98. The attachment member 18 defines a first fluid chamber 116 for the first fluid line 26 and a second fluid chamber 102 for the second fluid line 28. The chamber 102 for the injection line 28 includes a back flow valve 100. The valve 100 includes a floating ball 106 engaging a shoulder portion 104 of the chamber 102. A coil spring 108 pushes the ball 106 to close the chamber 102 when the main valve 20 closes flow from the injection line 28. The ball 106 includes a first curved surface 110 and a second curved surface 112 on the upstream side of the ball 106. The first curved surface 110 is elongated giving the ball a somewhat egg shaped profile. This provides for less turbulence and more laminar flow over the ball 106 when the valve 100 is open. However, when flow is insufficient to overcome the force of the valve spring 108, the ball 106 is forced against the narrowing shoulder portion 104 and the valve closes 100.

Although the attachment member 18 includes two fittings 92 and 94 for the embodiment shown, it can be appreciated that attachments having a fitting for a single fluid line may also be utilized with the spray gun 10. Moreover, the size of the chambers 102 and 116 in the attachment member 18 for fluid flow may be different in other attachments so that the flow may be altered by interchanging other attachment members 18. In addition to changing the size, the relative size between the chamber for the main line 116 and the injection line 102 may also be altered to affect the fluid pressure.

Figure 2:
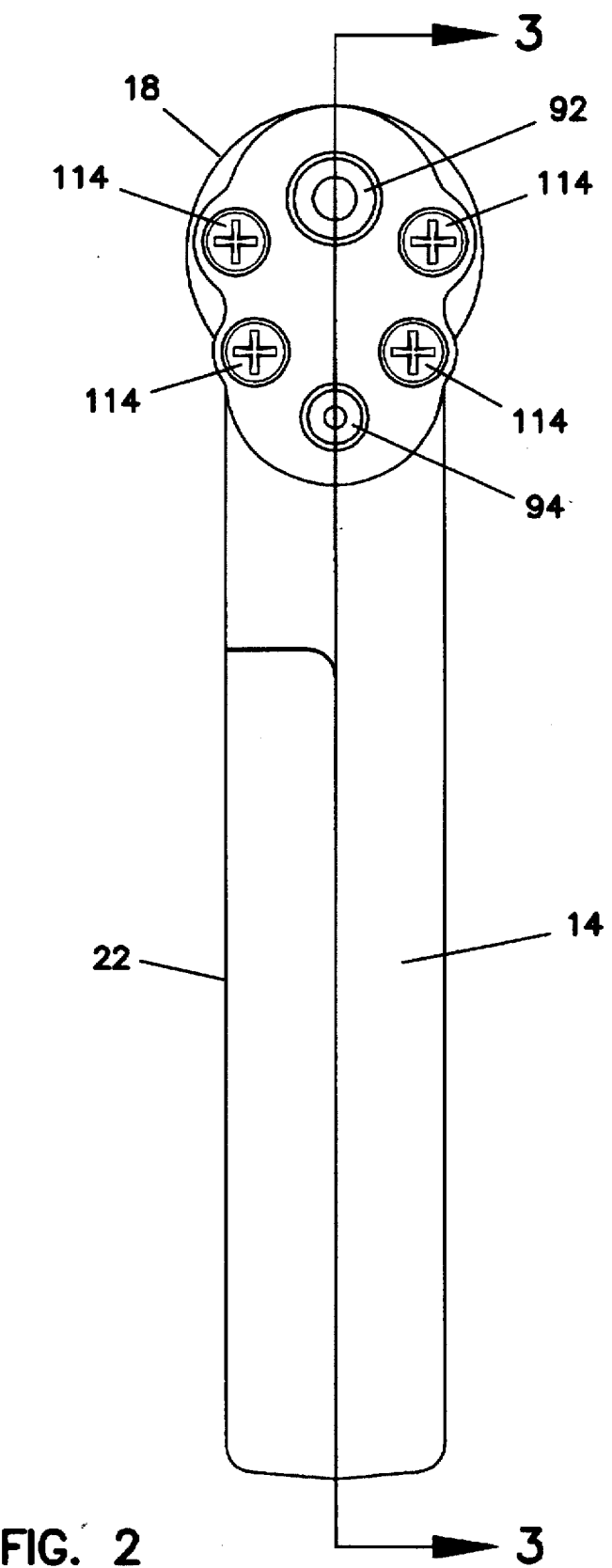
FIG. 2 shows a rear elevation view of the spray gun shown in FIG. 1.

As shown in FIG. 2, the attachment member 18 is secured to the spray gun 10 with screws 114. The screws 114 may be easily removed to interchange other attachment members having different fittings 92 and 94. In addition, it can be seen that the handle 14 includes a cover 22 which allows for simple assembly of the valve system.

In operation, the gun 10 is in a non-spraying position, as shown in FIG. 3. In this position, the lever 16 is fully extended and pivoted outward from the handle 14. The valve stem 48 is forced upward so that the end plug member 60 seats against the edge of the opening and fully covers the opening 52 of the barrel chamber 50. This prevents flow from either the main or injection lines 26 or 28. In addition, the sliding shoulder member 66 provides a secondary seal against both backflow as well as flow from the injection line 28. Further backflow prevention is provided by the backflow valve 100 which is in a closed position.

Figure 4:
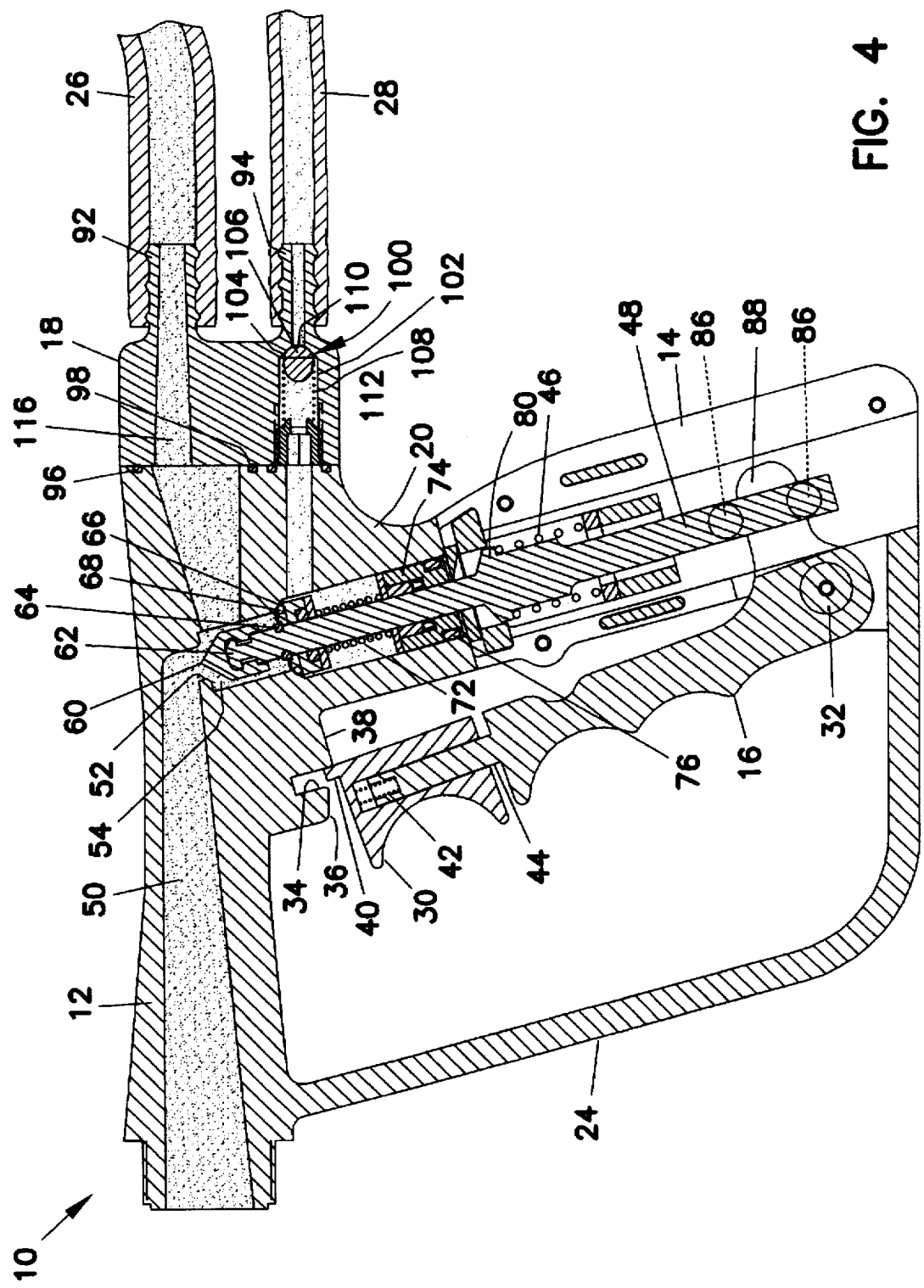
FIG. 4 shows a sectional view taken along line 3–3 of FIG. 2 with the valve open for spraying one fluid.
Figure 5:
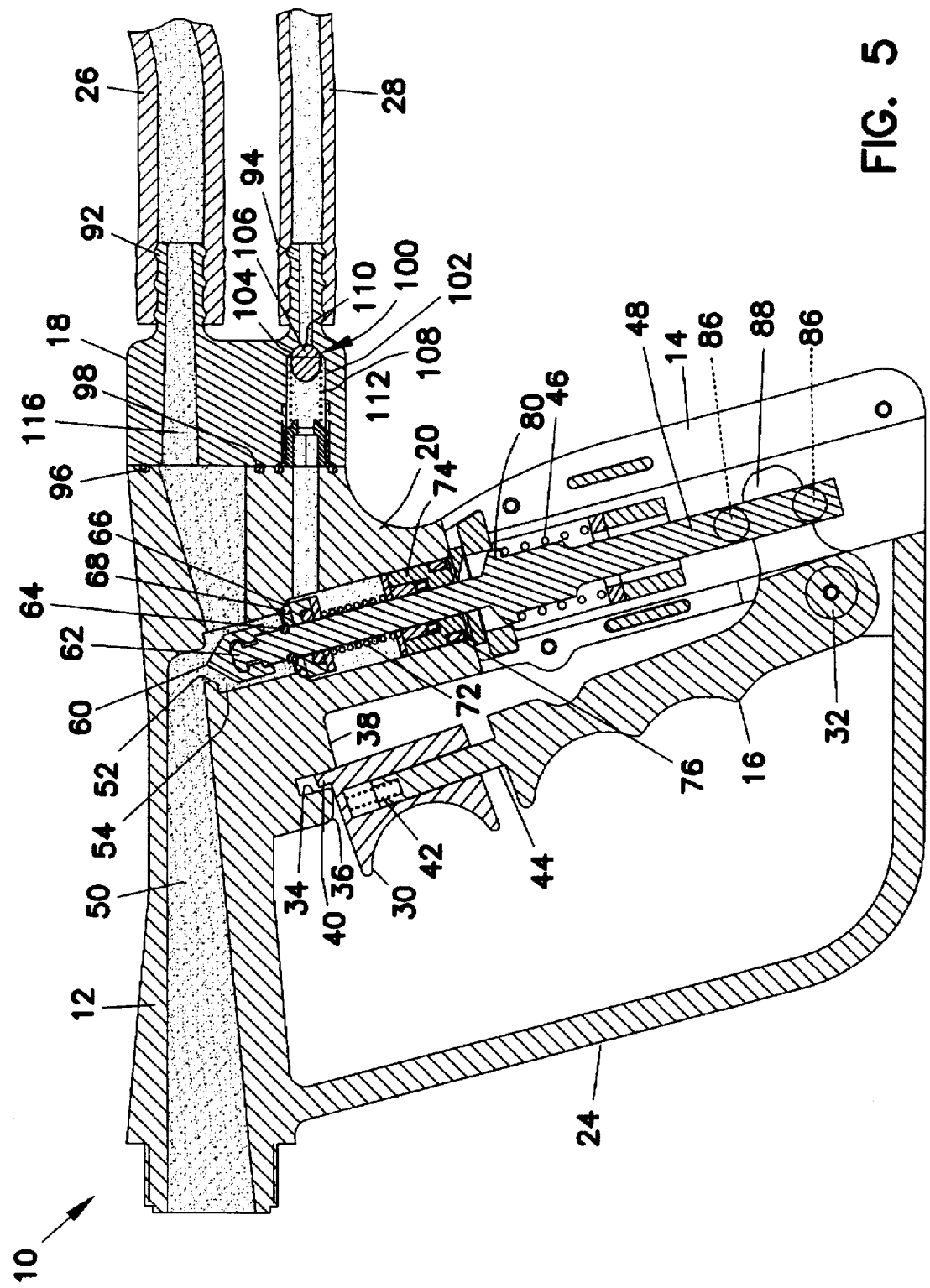
FIG. 5 shows a sectional view taken along line 3–3 of FIG. 2 with the valve open for spraying one fluid and the trigger locked in a spraying position; and, FIG. 6 shows a sectional view taken along line 3–3 of FIG. 2 with the valve open for spraying a mixture of two fluids.

To spray a single fluid, the lever 16 is pulled inward to the position shown in FIG. 4. At this position, the tab 40 engages the ledge 38 so that an operator need only pull the lever 16 inward until it stops. The valve stem 48 is pulled downward so that the end plug member 60 uncovers the opening 52 to the barrel chamber 50. This allows flow from the main line entering fitting 92 to flow through the barrel portion and be sprayed.

In this position, the sliding shoulder member 66 engages a narrowing portion 68 to prevent flow from the second fluid line 28 to mix with flow from the first fluid line 26. It can be appreciated that the pressure differential must be less than the force of the spring 72. In addition to preventing flow through the injection line to mix with the first fluid, the sliding shoulder member 66 also acts as the seal against backflow from the first fluid into the second fluid. The backflow valve 100 also prevents backflow should the operator pull the shoulder member 66 downward, or should any of the first fluid otherwise leak backward.

If it is desired to spray both fluids, the lever 16 is moved to the position shown in FIG. 6. To accomplish this, the sliding portion of the trigger 30 is pulled downward depressing the spring 42 so that the tab 40 clears the ledge 38. The lever 16 is then pulled inward against the handle 14. This action pulls the valve stem 48 further downward, forcing the tabs 64 to engage the sliding shoulder member 66 and open the narrowing portion 68, allowing the second fluid to flow into the first fluid. Once the sliding shoulder member 66 has opened the second fluid line, the force of the spring 108 in the backflow valve 100 is insufficient by itself to overcome the flow of the second fluid. Therefore, the backflow valve 100 opens with the floating ball 106 compressing the spring 108, allowing the second fluid to flow around the edges of the ball 106 and pass the opening around the sliding shoulder member 66 and the end plug member 60 to mix with the first fluid so that both fluids are sprayed.

It can be appreciated that with this configuration, a constant spray of one fluid can be easily maintained with the lever 16 locked, as shown in FIG. 5, requiring less effort for an operator to maintain spray. Spraying both fluids also requires little effort as the handle 14 acts as a bearing surface for holding the lever 16 at a second spraying position. If both fluids are being sprayed, as shown in FIG. 6, easing of the pressure against the lever 16 will move the valve stem 48 upward and close the flow of the second fluid. Once the tab 40 has passed the ledge 38, the lever spring 46 will force the sliding trigger portion 30 upward so that the operator may pull the lever 16 inward without spraying both fluids.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A spray gun, comprising:
   valve means for controlling flow of two fluids;
   valve actuation means for actuating the valve means between a first position without flow, a second position wherein a first fluid flows through the gun, a third position wherein a second fluid flows with the first fluid, and a fourth position wherein the valve means is locked with the first fluid flowing through the gun, wherein the valve actuation means comprises a lever pivoting at a lower end thereof and comprising a lock for locking the lever in the fourth position, wherein the lever includes a sliding end member having a tab extending therefrom and the lock includes a catch having an angled portion guiding the tab, wherein the catch engages and retains the tab when the lever is in the fourth position, and wherein the lock includes a ledge engaging the tab when the lever is in the second position, and wherein the tab clears the ledge when the lever is in the third position; and,
   biasing means for biasing the lever toward the first position.

2. A spray gun according to claim 1, wherein the spray gun comprises a barrel and a handle.

3. A spray gun according to claim 2, wherein the gun further comprises interchangeable attachments having fluid line fittings extending therefrom.

4. A spray gun according to claim 3, wherein the fitting is removable and replaceable.

5. A spray gun according to claim 4, wherein the fitting is interchangeable with fittings of various sizes for adapting to fluid sources having various size fittings.

6. A spray gun according to claim 1, wherein the valve means comprises first valving means for controlling fluid flow and second valving means for controlling fluid flow of the second fluid, and first biasing means for biasing the first valving means toward a closed position and second biasing means for biasing the second valving means toward a closed position.

7. A spray gun according to claim 6, wherein the valve means and first and second biasing means are housed in a handle portion of the spray gun.

8. A spray gun according to claim 7, wherein the lever pivots at a first end in the handle of the gun.

9. A spray gun for spraying a plurality of fluids, comprising:
   valve means for controlling flow of a first fluid and a second fluid;
   a lever for actuating the valve means comprising a first stop for supporting the lever at a first lever position wherein the first fluid is sprayed and a second stop for supporting the lever at a second lever position wherein the first fluid and the second fluid are sprayed; wherein the lever comprises a sliding end member slidable between a first position wherein the end member is engageable with the first stop, a second position wherein the end member clears the first stop, and a third position wherein the end member is locked at the first lever position wherein the first fluid is sprayed.

10. A spray gun according to claim 9, wherein the sliding end member includes biasing means for biasing the sliding end member toward the first position and the biasing means resists sliding of the sliding end member toward the second position, and wherein the sliding end member disengages the biasing means in the third position.

11. A spray gun according to claim 10, further comprising a spring engaging the lever and urging the lever toward a non-spraying lever position.

12. A spray gun having a barrel and a handle extending downward from the barrel for spraying a first fluid and a second fluid, comprising:

valve means housed in the handle for controlling flow of the first and second fluids actuatable between a first valve position for spraying the first fluid and a second valve position for spraying the first fluid and second fluid;

fluid receiving means at a rear of the barrel for receiving the first and second fluids; and backflow valving means, including a spring loaded ball having an elliptical profile for dampening an initial flow burst when the backflow valving means opens.

13. A spray gun according to claim 12 wherein the fluid receiving means insert comprises a one way valve providing for flow of the second fluid into the gun and preventing flow of the first fluid into the second fluid.

14. A spray gun according to claim 12, wherein the elliptical profile of the spring loaded ball reduces turbulence in an open position.

* * * * *